United States Patent
Hinz et al.

[11] Patent Number: 5,552,450
[45] Date of Patent: Sep. 3, 1996

[54] PRODUCTION OF RIGID POLYURETHANE FOAMS

[75] Inventors: Werner Hinz, Frankenthal; Rolf Henn, Ketsch; Uwe Keppeler, Hochdorf-Assenheim; Bernd Guettes, Sallgast, all of Germany

[73] Assignee: BASF Aktiengesellschaft, Germany

[21] Appl. No.: 229,255

[22] Filed: Apr. 18, 1994

[51] Int. Cl.$^6$ .................................................. C08G 18/00
[52] U.S. Cl. ........................... 521/174; 521/170; 528/48; 528/76; 528/77; 528/80; 528/85
[58] Field of Search ..................... 521/174, 170; 528/48, 76, 77, 80, 85

[56] References Cited

U.S. PATENT DOCUMENTS 4,897,431  1/1990  Scherzer et al. ............... 521/172

FOREIGN PATENT DOCUMENTS

| 0320134 | 6/1989 | European Pat. Off. . |
| 2271261 | 12/1975 | France . |
| WO86/02635 | 5/1986 | WIPO . |
| WO91/01342 | 2/1991 | WIPO . |

Primary Examiner—James J. Seidleck
Assistant Examiner—Duc Truong
Attorney, Agent, or Firm—Dennis V. Carmen

[57]  ABSTRACT

A process for the production of rigid polyurethane foams involves reacting a) organic and/or modified organic polyisocyanates with b) at least one relatively high-molecular-weight compound containing at least two reactive hydrogen atoms, and, if desired, c) low-molecular-weight chain extenders and/or cross-linking agents, in the presence of d) blowing agents, e) catalysts and, if desired, f) assistants and/or additives, where the relatively high-molecular-weight compounds (b) containing at least two reactive hydrogen atoms are polyoxypropylene-polyols and/or polyoxyethylene-polyoxypropylene-polyols containing up to 20% by weight, based on the weight of the alkylene oxide units, of pendant oxyethylene units containing secondary hydroxyl groups and having a functionality of from 3.8 to 4.1, a hydroxyl number of from 385 to 410 mg of KOH/g and a viscosity of from 1700 to 2400 mPa·s at 25° C., and which can be prepared by anionic polymerization of 1,2-propylene oxide and, if desired, ethylene oxide on an initiator molecule mixture comprising sucrose, pentaerythritol and diethylene glycol.

8 Claims, No Drawings

PRODUCTION OF RIGID POLYURETHANE FOAMS

The present invention relates to a process for the production of rigid polyurethane foams using low-viscosity polyether-polyols.

The production of rigid polyurethane foams by reacting organic polyisocyanates and/or modified organic polyisocyanates with higher-functional compounds containing at least two reactive hydrogen atoms, for example polyoxyalkylenepolyamines and/or preferably organic polyhydroxyl compounds having molecular weights of, for example, from 300 to 2000, and, if desired, chain extenders and/or crosslinking agents having molecular weights of up to approximately 400 in the presence of catalysts, blowing agents, assistants and/or additives is known and has been described many times. A review on the production of rigid polyurethane foams is given, for example, in Kunststoff-Handbuch, Volume VII, Polyurethane, 1st Edition, 1966, edited by Dr. R. Vieweg and Dr. A. Höchtlen, and 2nd Edition, 1983, edited by Dr. G. Oertel (Carl. Hanser Verlag, Munich).

The polyol components employed for rigid polyurethane foam systems are usually highly functional short-chain polyether alcohols having a high hydroxyl number. Products of this type are usually prepared by anionic polymerization of lower alkylene oxides, usually 1,2-propylene oxide, alone or mixed with ethylene oxide, on highly functional, usually at least tetrafunctional, compounds containing active hydrogen atoms. Customary initiator substances, in addition to a/mines, are highly functional hydroxyl-containing compounds, for example pentaerythritol, sorbitol, mannitol, xylitol, glucose or sucrose.

The sucrose, which is obtained from renewable raw materials, is, due to its high functionality of 8, very frequently employed as initiator substance for rigid-foam polyether alcohols. In addition to its high functionality, which enables the production of highly crosslinked polyurethane parts, sucrose is distinguished by ready availability and low price. Since it can only be reacted with difficulty, as a solid, with alkylene oxides, it is usually reacted together with other NH-functional and/or in particular OH-functional compounds which are liquid at the alkoxylation temperature, known as co-initiators.

There is a large number of publications in the prior art on this subject, for example Kunststoff-Handbuch, Volume VII, Polyurethane, 1st Edition, 1966, edited by Dr. R. Vieweg, Dr. A. Höchtlen and 2nd Edition, 1983, edited by Dr. G. Oertel (Carl-Hanser Verlag, Munich), but also the patent literature, for example DE-B 14 93 395, DE-B 11 76 358, DE-C 11 96 870, DE-B 12 10 554, DE-A 25 49 449 and DD-WP 136 833.

Since the liquid coinitiators usually employed mostly have significantly lower functionality than sucrose, the functionality of the polyether-ols drops considerably when large amounts of coinitiator are used, and an essential advantage of the sucrose is lost. Although the functionality of the polyether-ols remains high if smaller amounts of coinitiators are used, the products then have high viscosity. Although this problem can be overcome in part by using larger amounts of alkylene oxide, the resultant products have a low hydroxyl number and, on further conversion into rigid foes, have worse mechanical properties; in particular, curing is incomplete.

The increased viscosity of the resultant polyether-ols which occurs on alkoxylation of sucrose by means of small amounts of coinitiators has been tolerated in the past since the CFC-based blowing agents usually employed in rigid polyurethane foam systems resulted in a reduction in the viscosity of the polyol component. Since the use of these blowing agents is declining considerably for ecological reasons, there is a need for the provision of sucrose-initiated polyether-ols which have high functionality and a high hydroxyl number at the same time as low viscosity.

It is an object of the present invention to provide rigid polyurethane foams in which the polyol component comprises sucrose-initiated polyether-ols of low viscosity, high functionality and high hydroxyl number in order to achieve thorough curing at the same time as the good flow properties of polyurethane systems.

We have found that, surprisingly, this object is achieved by a process for the production of rigid polyurethane foams by reacting a) organic and/or modified organic polyisocyanates with b) at least one relatively high-molecular-weight compound containing at least two reactive hydrogen atoms, and, if desired, c) low-molecular-weight chain extenders and/or crosslinking agents, in the presence of d) blowing agents, e) catalysts and, if desired, f) assistants and/or additives, where the relatively high-molecular-weight compounds (b) containing at least two reactive hydrogen atoms are polyoxypropylene-polyols and/or polyoxyethylene-polyoxypropylene-polyols containing up to 20% by weight, based on the weight of the alkylene oxide units, of pendant oxyethylene units containing secondary hydroxyl groups and having a functionality of from 3.8 to 4.1, a hydroxyl number of from 385 to 410 mg of KOH/g and a viscosity of from 1700 to 2400 mPa·s at 25° C., and which can be prepared by anionic polymerization of 1,2-propylene oxide and, if desired, ethylene oxide on an initiator molecule mixture comprising sucrose, pentaerythritol and diethylene glycol.

The present invention accordingly provides a process for the production of rigid polyurethane foams by reacting a) organic and/or modified organic polyisocyanates with b) at least one relatively high-molecular-weight compound containing at least two reactive hydrogen atoms, and, if desired, c) low-molecular-weight chain extenders and/or crosslinking agents, in the presence of d) blowing agents, e) catalysts and, if desired, f) assistants and/or additives, where the relatively high-molecular-weight compounds (b) containing at least two reactive hydrogen atoms are polyoxypropylene-polyols and/or polyoxyethylene-polyoxypropylene-polyols containing up to 20% by weight, based on the weight of the alkylene oxide units, of pendant oxyethylene units containing secondary hydroxyl groups and having a functionality of from 3.8 to 4.1, a hydroxyl number of from 385 to 410 mg of KOH/g and a viscosity of from 1700 to 2400 mPa·s at 25° C., and which can be prepared by anionic polymerization of 1,2-propylene oxide and, if desired, ethylene oxide on an initiator molecule mixture comprising sucrose, pentaerythritol and diethylene glycol.

The initiator substance mixture advantageously comprises from 12 to 18% by weight of sucrose, from 4 to 7% by weight of pentaerythritol and from 8 to 11% by weight of diethylene glycol, in each case based on the total weight of the polyether alcohol.

In an advantageous embodiment, the alkoxide is first formed from pentaerythritol, diethylene glycol and aqueous potassium hydroxide solution with complete removal of the water of reaction, the sucrose is then added, the components are mixed vigorously until the sucrose has been fully homogenized, and only then is the resultant initiator mixture reacted with alkylene oxide.

The fact that it is possible to achieve the object of the invention by using the polyether alcohols used according to the invention was surprising. It would instead have been expected that joint alkoxylation of the solids sucrose and pentaerythritol would, in spite of the additional use of the liquid coinitiator diethylene glycol, likewise have given high-viscosity products, or low-viscosity polyether-ols which are possible at high diethylene glycol contents would in turn result in rigid polyurethane foams having impaired mechanical properties.

Surprisingly, however, these products, with hydroxyl numbers of about 400 and functionalities of about 4, merely have viscosities in the region of 2000 mPa·s at 25° C. Only using the novel polyether-ols according to the invention can rigid polyurethane foams be produced which combine excellent flow properties with thorough curing, ie. optimum demoldability of polyurethane parts.

Due to these properties, rigid polyurethane foams having very good mechanical properties can be produced from these products even using no CFCs and even using water as the only blowing agent.

The polyether alcohols employed according to the invention are prepared by the generally known mechanism of base-catalyzed alkylene oxide adduction onto OH-functional initiator substances, described, for example, in Robert Becker, Polyurethane, Fachbuchverlag Leipzig, 1973.

In this reaction, the initiator substance mixture is mixed with the basic catalyst, for which purpose amines, but preferably alkali metal and/or alkaline earth metal hydroxides and/or basic salts thereof, in particular potassium hydroxide, are employed, and the alkylene oxides, in particular propylene oxide, alone or together with up to 20% by weight of ethylene oxide, based on the amount of alkylene oxide, are metered in at conventional temperatures, usually in the range from about 80° to 50° C.

In order to prevent side-reactions and for safety reasons, the reactor should be flushed with nitrogen before addition of the alkylene oxide.

In order to suppress the formation of low-molecular-weight diols, it is advantageous first to react the pentaerythritol and the diethylene glycol with the basic catalyst to give the alkoxide and to remove the resultant water of reaction from the reaction mixture by distillation under reduced pressure during formation of the alkoxide. The reaction temperature here should be in the range from 80 to 100° C. and the pressure should be in the region of 25 mbar. The sucrose is introduced into the resultant alkoxide, and the mixture is homogenized and then reacted with alkylene oxides. It is advantageous to delay metering of the alkylene oxide until the initiator substance mixture has been fully homogenized. To this end, the initiator mixture should be stirred vigorously for at least one hour at room temperature, up to a maximum of 70° C. after the addition of sucrose is complete. The alkylene oxide metering is followed by a post-reaction phase in order to completely react the alkylene oxide.

The basic catalyst is then, in the usual manner, neutralized and removed. This can be accomplished by neutralization by means of acids or acidic salts, but the addition of adsorbents, for example aluminosilicates, is also possible. The solids are usually removed by pressure filtration or centrifugation.

This is usually followed by vacuum distillation at about 1 mbar and about 100° C. in order to remove the water and other readily volatile constituents.

For stabilization against thermooxidative degradation, the finished polyether alcohol is treated with stabilizers, for example sterically hindered phenols.

The rigid polyurethane foams are produced by reacting, in a manner known per se, a) organic and/or modified organic polyisocyanates with b) the polyether alcohols according to the invention, if desired together with other relatively high-molecular-weight compounds containing at least two reactive hydrogen atoms, c) low-molecular-weight chain extenders and/or cross-linking agents, in the presence of d) blowing agents and in the presence of e) catalysts and, if desired, f) conventional further assistants and/or additives, The rigid polyurethane foams are produced by the process according to the invention using the formative components which are known per se, to which the following details apply:

a) Suitable organic polyisocyanates are aliphatic, cycloaliphatic, araliphatic and preferably aromatic polyisocyanates.

The following may be mentioned as examples: alkylene diisocyanates having from 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane (isophorone diisocyanate), 2,4- and 2,6-hexahydrotolylene diisocyanate and the corresponding isomer mixtures, 4,4'-, 2,2'- and 2,4'-dicyclohexylmethane diisocyanate and the corresponding isomer mixtures, and preferably aromatic diisocyanates and polyisocyanates, e.g. 2,4- and 2,6-tolylene diisocyanate and the corresponding isomer mixtures, 4,4'- 2,4'- and 2,2'-diphenylmethane diisocyanate and the corresponding isomer mixtures, mixtures of 4,4'- and 2,4'-diphenylmethane diisocyanates, polyphenyl-polymethylene polyisocyanates, mixtures of 4,4'-, 2,4'- and 2,2'-diphenylmethane diisocyanates and polyphenyl-polymethylene polyisocyanates (crude MDI), and mixtures of crude MDI and tolylene diisocyanates. The organic diisocyanates and polyisocyanates may be employed individually or in the form of mixtures.

Frequently, modified polyisocyanates are also used, ie. products which are obtained by chemical reaction of organic diisocyanates and/or polyisocyanates. Specific examples are ester-, urea-, biuret-, allophanate-, carbodiimide-, isocyanurate-, uretdione- and/or urethane-containing diisocyanates and/or polyisocyanates. Individual examples are urethane-containing organic, preferably aromatic, polyisocyanates containing from 33.6 to 15% by weight, preferably from 31 to 21% by weight, of NCO, based on the total weight, for example 4,4'-diphenylmethane diisocyanate, 4,4'- and 2,4'-diphenylmethane diisocyanate mixtures, crude MDI or 2,4- or 2,6-tolylene diisocyanate modified by means of low-molecular-weight diols, triols, dialkylene glycols, trialkylene glycols or polyoxyalkylene glycols having molecular weights of up to 6000, in particular up to 1500, specific examples of di- and polyoxyalkylene glycols, which can be employed individually or as mixtures, being diethylene glycol, dipropylene glycol, polyoxyethylene glycol, triol and/or tetrol, polyoxypropylene glycol, triol and/or tetrol and polyoxypropylenepolyoxyethylene glycol, triol and/or tetrol. NCO-containing prepolymers containing from 25 to 3.5% by weight, preferably from 21 to 14% by weight, of NCO, based on the total weight, and prepared from the polyester- and/or preferably polyether-polyols described below and 4,4'-diphenylmethane diisocyanate, mixtures of 2,4'- and 4,4'-diphenylmethane diisocyanate, 2,4- and/or 2,6-tolylene diisocyanates or crude MDI are also suitable. Furthermore, liquid polyisocyanates containing carbodiimide groups and/or isocyanurate rings and containing from 33.6 to 15% by weight, preferably from 31 to 21% by weight, of NCO, based on the total weight, e.g. based on 4,4'- 2,4'- and/or 2,2'-diphenylmethane diisocyanate and/or 2,4- and/or 2,6-tolylene diisocyanate, have also proven successful.

The modified polyisocyanates may be mixed with one another or with unmodified organic polyisocyanates, e.g. 2,4'- or 4,4'-diphenylmethane diisocyanate, crude MDI or 2,4- and/or 2,6-tolylene diisocyanate.

Organic polyisocyanates which have proven particularly successful and are therefore preferably used are mixtures of tolylene diisocyanates and crude MDI or mixtures of modified urethane group-containing organic polyisocyanates containing from 33.6 to 15% by weight of NCO, in particular those based on tolylene diisocyanates, 4,4'-diphenylmethane diisocyanate, diphenylmethane diisocyanate isomer mixtures or crude MDI and in particular crude MDI containing from 30 to 80% by weight, preferably from 30 to 55% by weight, of diphenylmethane diisocyanate isomers.

b) In addition to the polyether-ols used according to the invention, it is also possible to use further relatively high-molecular-weight compounds containing at least two reactive hydrogen atoms, expediently those having a functionality of from 2 to 8, preferably from 2 to 6, and a molecular weight of from 300 to 8000, preferably from 300 to 3000. Particular success has been achieved using, for example, polyether-polyamines and/or preferably polyols selected from the group consisting of polyether-polyols, polyester-polyols, polythioether polyols, polyester-amides, hydroxyl-containing polyacetals and hydroxyl-containing aliphatic polycarbonates, or mixtures of at least two of said polyols. Preference is given to polyester-polyols and/or polyether-polyols. The hydroxyl number of the polyhydroxyl compounds is generally from 150 to 850, preferably from 200 to 600.

Suitable polyester-polyols may be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids my be used either individually or mixed with one another. The free dicarboxylic acids may also be replaced by the corresponding dicarboxylic acid derivatives, for example dicarboxylic acid esters of alcohols having from 1 to 4 carbon atoms or dicarboxylic anhydrides. Preference is given to dicarboxylic acid mixtures comprising succinic acid, glutaric acid and adipic acid in ratios of, for example, from 20 to 35:35 to 50:20 to 32 parts by weight, and in particular adipic acid. Examples of dihydric and polyhydric alcohols, in particular diols, are ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Preference is given to ethanediol, diethylene glycol, 1,4-butanediol, 1,5-pentanediol, 1,6-hexanediol and mixtures of at least two of said diols, in particular mixtures of 1,4-butanediol, 1,5-pentanediol and 1,6-hexanediol. Furthermore, polyester-polyols made from lactones, e.g. ε-caprolactone or hydroxycarboxylic acids, e.g. ω-hydroxycaproic acid, may also be employed.

The polyester-polyols may be prepared by polycondensing the organic, e.g. aromatic and preferably aliphatic polycarboxylic acids and/or derivatives thereof and polyhydric alcohols without using a catalyst or preferably in the presence of an esterification catalyst, expediently in an inert gas atmosphere, e.g. nitrogen, carbon monoxide, helium, argon, inter alia, in the melt at from 150° to 250° C., preferably from 180° to 220° C., at atmospheric pressure or under reduced pressure until the desired acid number, which is advantageously less than 10, preferably less than 2, is reached. In a preferred embodiment, the esterification mixture is polycondensed at the abovementioned temperatures under atmospheric pressure and subsequently under a pressure of less than 500 mbar, preferably from 50 to 150 mbar, until an acid number of from 80 to 30, preferably from 40 to 30, has been reached. Examples of suitable esterification catalysts are iron, cadmium, cobalt, lead, zinc, antimony, magnesium, titanium and tin catalysts in the form of metals, metal oxides or metal salts. However, the polycondensation may also be carried out in the liquid phase in the presence of diluents and/or entrainers, e.g. benzene, toluene, xylene or chlorobenzene, for removal of the water of condensation by azeotropic distillation.

The polyester-polyols are advantageously prepared by polycondensing the organic polycarboxylic acids and/or derivatives thereof with polyhydric alcohols in a molar ratio of from 1:1 to 1.8, preferably from 1:1.05 to 1.2.

The polyester-polyols obtained preferably have a functionality of from 2 to 4, in particular from 2 to 3, and a molecular weight of from 480 to 3000, preferably from 600 to 2000, in particular from 600 to 1500.

However, the polyols used are, in particular, polyether-polyols prepared by conventional processes, for example by anionic polymerization using alkali metal hydroxides, such as sodium hydroxide or potassium hydroxide, or alkali metal alkoxides, such as sodium methoxide, sodium ethoxide, potassium ethoxide or potassium isopropoxide as catalysts and with addition of at least one initiator molecule containing from 2 to 8, preferably from 2 to 6, reactive hydrogen atoms in bound form, or by cationic polymerization using Lewis acids, such as antimony pentachloride, boron fluoride etherate, inter alia, or bleaching earth as catalysts, from one or more alkylene oxides having from 2 to 4 carbon atoms in the alkylene moiety.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, alternately one after the other or as mixtures. Examples of suitable initiator molecules are water, organic dicarboxylic acids, such as succinic acid, adipic acid, phthalic acid and terephthalic acid, aliphatic and aromatic, unsubstituted or N-mono-, N,N- and N,N'-dialkyl-substituted diamines having from 1 to 4 carbon atoms in the alkyl moiety, such as unsubstituted or mono- or dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-tolylenediamine and 4,4'- 2,4'- and 2,2'-diaminodiphenylmethane.

Other suitable initiator molecules are alkanolamines, e.g. ethanolamine, N-methyl- and N-ethyl-ethanolamine, dialkanolamines, e.g. diethanolamine, N-methyl- and N-ethyl-diethanolamine, and trialkanolamines, e.g. triethanolamine, and ammonia. Preference is given to polyhydric alcohols, in particular dihydric and/or trihydric alcohols, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose.

The polyether-polyols, preferably polyoxypropylene- and polyoxypropylene-polyoxyethylene-polyols, have a functionality of from 2 to 6, preferably in particular from 2 to 4, and molecular weights of from 300 to 3000, preferably from 300 to 2000, in particular from 400 to 2000, and suitable polyoxytetramethylene glycols have a molecular weight of up to approximately 3500.

Other suitable polyether-polyols are polymer-modified polyether-polyols, preferably graft polyether-polyols, in particular those based on styrene and/or acrylonitrile and prepared by in-situ polymerization of acrylonitrile, styrene or preferably mixtures of styrene and acrylonitrile, for example in a weight ratio of from 90:10 to 10:90, preferably from 70:30 to 30:70, expediently in the abovementioned polyetherpolyols by a method similar to that of German Patents 11 11 394, 12 22 669 (U.S. Pat. Nos. 3,304,273, 3,383,351 and 3,523,093), 11 52 536 (GB 1,040,452) and 11 52 537 (GB 987,618), and polyether-polyol dispersions which contain, as the disperse phase, usually in an amount of from 1 to 50% by weight, preferably from 2 to 25% by weight, for example polyureas, polyhydrazides, polyurethanes containing tert-amino groups in bound form, and/or melamine and are described, for example, in EP-B-011 752 (U.S. Pat. No. 4,304,708), U.S. Pat. No. 4,374,209 and DE-A-32 31 497.

Like the polyester-polyols, the polyether-polyols can be used individually or in the form of mixtures. Furthermore, they may be mixed with the graft polyetherpolyols or polyester-polyols and the hydroxyl-containing polyesteramides, polyacetals, polycarbonates and/or polyether-polyamines.

Examples of suitable hydroxyl-containing polyacetals are the compounds which can be prepared from glycols, such as diethylene glycol, triethylene glycol, 4,4'-dihydroxyethoxy-diphenyldimethylmethane, hexanediol and formaldehyde. Suitable polyacetals can also be prepared by polymerizing cyclic acetals.

Suitable hydroxyl-containing polycarbonates are those of a conventional type, which can be prepared, for example, by reacting diols, such as 1,3-propanediol, 1,4-butanediol and/or 1,6-hexanediol, diethylene glycol, triethylene glycol or tetraethylene glycol, with diaryl carbonates, e.g. diphenyl carbonate, or phosgene.

The polyester-amides include, for example, the predominantly linear condensates obtained from polybasic, saturated and/or unsaturated carboxylic acids or anhydrides thereof and polyhydric, saturated and/or unsaturated amino alcohols, or mixtures of polyhydric alcohols and amino alcohols and/or polyamines.

Suitable polyether-polyamines can be prepared from the abovementioned polyether-polyols by known processes. The examples which may be mentioned are the cyanoalkylation of polyoxyalkylene-polyols and subsequent hydrogenation of the resultant nitrile (U.S. Pat. No. 3,267,050) or the partial or complete amination of polyoxyalkylenepolyols using a/mines or ammonia in the presence of hydrogen and catalysts (DE 12/15 373).

c) The rigid polyurethane foams may be produced with or without the use of chain extenders and/or crosslinking agents. However, it may prove advantageous, in order to modify the mechanical properties, for example the hardness, to add chain extenders, crosslinking agents or, if desired, mixtures thereof. The chain extenders and/or crosslinking agents used are diols and/or triols, having a molecular weight of less than 400, preferably from 60 to 300. Examples are aliphatic, cycloaliphatic and/or araliphatic diols having from 2 to 14 carbon atoms, preferably from 4 to 10 carbon atoms, e.g. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl)hydroquinone, triols, such as 1,2,4- and 1,3,5-trihydroxycyclohexane, glycerol and trimethylolpropane, and low-molecular-weight hydroxyl-containing polyalkylene oxides, based on ethylene oxide and/or 1,2-propylene oxide, and the abovementioned diols and/or triols as initiator molecules.

Any chain extenders, crosslinking agents or mixtures thereof used to produce the rigid polyurethane foams are expediently used in an amount of from 0 to 20% by weight, preferably from 2 to 8% by weight, based on the weight of the polyol compound (b).

d) Blowing agents which can be used are the chlorofluoro carbons and highly fluorinated and/or perfluorinated hydrocarbons generally known from polyurethane chemistry. However, the use of these substances is greatly restricted or even prohibited for ecological reasons.

An alternative is, for example, aliphatic and/or cycloaliphatic hydrocarbons, in particular cyclopentane.

These hydrocarbons are usually added, if desired in combination with highly fluorinated and/or perfluorinated hydrocarbons, in the form of an emulsion of formative component (b). The emulsifiers usually used are oligomeric acrylates, which contain bonded polyoxyalkylene and fluoroalkane radicals as side groups and have a fluorine content of from about 5 to 30% by weight. Products of this type are sufficiently known from polymer chemistry, for example EP-A 351 614.

The amount of blowing agent or blowing agent mixture used is from 2 to 25% by weight, preferably from 5 to 15% by weight, and the amount of emulsifier used is from 0.01 to 6% by weight, in each case based on formative component (b).

It is also possible to add, as blowing agent, water to formative component (b) in an amount of from 0.5 to 5% by weight, based on formative component (b). The water can also be added in combination with the other blowing agents described.

e) The catalysts (e) used to produce the rigid polyurethane foams are, in particular, compounds which greatly accelerate the reaction of the compounds of component (b) which contain reactive hydrogen atoms, in particular hydroxyl groups, and if used, (c) with the organic, modified or unmodified polyisocyanates (a). Suitable compounds are organometallic compounds, preferably organotin compounds, such as tin(II) salts of organic carboxylic acids, e.g. tin(II) acetate, tin(II) octanoate, tin(II) ethylhexanoate and tin(II) laurate, and dialkyltin(IV) salts of organic carboxylic acids e.g. dibutyltin diacetate, dibutyltin dilaurate, dibutyltin maleate and dioctyltin diacetate. The organometallic compounds are employed alone or preferably in combination with highly basic amines, for example amidines, such as 2,3-dimethyl-3,4,5,6-tetrahydropyrimidine, tertiary amines, such as triethylamine, tributylamine, dimethylbenzylamine, N-methyl- N-ethyl- N-cyclohexylmorpholine, N,N,N'N'-tetramethylethylenediamine, N,N,N', N'-tetramethylbutanediamine, N,N,N'N'-tetramethyl-1,6-hexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]-octane and, preferably, 1,4-diazabicyclo[2.2.2] octane and alkanolamine compounds such as triethanolamine, triisopropanolamine, N-methyl- and N-ethyldiethanolamine and dimethylethanolamine.

Other suitable catalysts are tris(dialkylamino-alkyl)-s-hexahydrotriazines, in particular tris(N,N-dimethylaminopropyl)-s-hexahydrotriazine, tetraalkylammonium hydroxides, such as tetramethylammonium hydroxide, alkali metal hydroxides such as sodium hydroxide, and alkali metal alkoxides, such as sodium methoxide and potassium isopropoxide, and alkali metal salts of longchain fatty acids having from 10 to 20 carbon atoms and possibly containing lateral OH groups. From 0.001 to 5% by weight, in particular from 0.05 to 2% by weight, of catalyst or catalyst combination is preferably used, based on the weight of component (b).

f) If desired, assistants and/or additives (f) can be incorporated into the reaction mixture for the production of the rigid polyurethane foams. Specific examples are surfactants, foam stabilizers, cell regulators, fillers, dyes, pigments, flameproofing agents, hydrolysis-protection agents, and fungistatic and bacteriostatic substances.

Examples of suitable surfactants are compounds which serve to support homogenization of the starting materials and may also regulate the cell structure of the plastics. Specific examples are emulsifiers, such as the sodium salts of castor oil sulfates, or of fatty acids, and the salts of fatty acids with amines, for example diethylamine oleate, diethanolamine stearate and diethanolamine ricinoleate, salts of sulfonic acids, e.g. alkali metal salts or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkylphenols, oxyethylated fatty alcohols, paraffin oils, castor oil esters, ricinoleic acid esters, Turkey red oil and groundnut oil, and cell regulators, such as paraffins, fatty alcohols and dimethylpolysiloxanes. Suitable compounds for improving the emulsification action, the cell structure and/or stabilizing the foam are furthermore the above-described oligomeric acrylates containing polyoxyalkylene and fluoroalkane radicals as side groups. The surfactants are usually used in amounts of from 0.01 to 5 parts by weight, based on 100 parts by weight of component (b).

For the purposes of the present invention, fillers, in particular reinforcing fillers, are conventional organic and inorganic fillers, reinforcing agents, weighting agents, agents for improving abrasion resistance in paints, coating agents, etc. Specific examples are inorganic fillers, such as silicate minerals, for example sheet silicates, such as antigorite, serpentine, hornblendes, amphiboles, chrysotile, and talc; metal oxides, such as kaolin, aluminum oxides, titanium oxides and iron oxides, metal salts, such as chalk, barytes and inorganic pigments, such as cadmium sulfide, zinc sulfide and glass, inter alia. Preference is given to kaolin (china clay), aluminum silicate and coprecipitates of barium sulfate and aluminum silicate, and natural and synthetic fibrous minerals, such as wollastonite, and metal and, in particular, glass fibers of various lengths, which may be sized. Examples of suitable organic fillers are carbon, melamine, colophony, cyclopentadienyl resins and graft polymers, and cellulose fibers, polyamide fibers, polyacrylonitrile fibers, polyurethane fibers, and polyester fibers based on aromatic and/or aliphatic dicarboxylic acid esters, and in particular carbon fibers.

The inorganic and organic fillers may be used individually or as mixtures and are advantageously introduced into the reaction mixture in amounts of from 0.5 to 50% by weight, preferably from 1 to 40% by weight, based on the weight of components (a) to (c), but the content of mats, nonwovens and wovens made from natural and synthetic fibers may reach values of up to 80% by weight.

Examples of suitable flameproofing agents are tricresyl phosphate, tris(2-chloroethyl) phosphate, tris(2-chloropropyl) phosphate, tris(1,3-dichloropropyl) phosphate, tris(2,3-dibromopropyl) phosphate, tetrakis(2-chloroethyl)ethylene diphosphate, dimethyl methanephosphonate, diethyl diethanolaminomethylphosphonate and commercially available halogen-containing flameproofing polyols.

In addition to the abovementioned halogensubstituted phosphates, it is also possible to use inorganic or organic flameproofing agents, such as red phosphorus, aluminum oxide hydrate, antimony trioxide, arsenic oxide, ammonium polyphosphate and calcium sulfate, expandable graphite or cyanuric acid derivatives, e.g. melamine, or mixtures of two or more flameproofing agents, e.g. ammonium polyphosphates and melamine, and, if desired, corn starch, or ammonium polyphosphate, melamine and expandable graphite and/or, if desired, aromatic polyesters, in order to flameproof the polyisocyanate polyaddition products. In general, it has proven expedient to use from 5 to 50 parts by weight, preferably from 5 to 25 parts by weight, of said flameproofing agents per 100 parts by weight of component (b).

Further details on the other conventional assistants and additives mentioned above can be obtained from the specialist literature, for example from the monograph by J. H. Saunders and K. C. Frisch, High Polymers, Volume XVI, Polyurethanes, Parts 1 and 2, Interscience Publishers, 1962 and 1964 respectively, or Kunststoff-Handbuch, Polyurethane, Volume VII, Hanser-Verlag, Munich, Vienna, 1st and 2nd Editions, 1966 and 1983.

To produce the rigid polyurethane foams, the organic polyisocyanates (a), the relatively high-molecular-weight compounds containing at least two reactive hydrogen atoms (b) and, if used, the chain extenders and/or crosslinking agents (c) are reacted in such amounts that the ratio between the number of equivalents of NCO groups in the polyisocyanates (a) and the total number of reactive hydrogen atoms in components (b) and, if used, (c) is from 0.85 to 1.25:1, preferably from 0.95 to 1.15:1 and in particular 1 to 1.05:1. If the rigid polyurethane foams, at least in part, contain bonded isocyanurate groups, a ratio between the number of NCO groups in the polyisocyanates (a) and the total number of reactive hydrogen atoms in component (b) and, if used, (c) of from 1.5 to 60:1, preferably from 1.5 to 8:1, is usually used.

The rigid polyurethane foams are advantageously produced by the one-shot process, for example using the high-pressure or low-pressure method, in an open or closed mold, for example in a metallic mold. It has proven particularly advantageous to use the two-component method and to combine formative components (b), (d), (e) and, if used, (c) and (f) in component (A) and to use the organic or modified polyisocyanates (a) or a mixture of said polyisocyanates and, if used, the blowing agent (d) as component (B).

The starting components are mixed at from 15° to 90° C. preferably at from 20 to 60° C., in particular from 20° to 35° C., and introduced into the open or closed mold, if desired under superatmospheric pressure. The mixing can, as stated above, be carried out mechanically by means of a stirrer or a stirring screw. The mold temperature is expediently from 20° to 110° C., preferably from 30° to 60° C., in particular from 45° to 50° C.

The rigid polyurethane foams or rigid molded materials produced by the process according to the invention have a density of from 0.02 to 0.75 g/cm$^3$, preferably from 0,025 to 0.24 g/cm$^3$, in particular from 0.03 to 0.1 g/cm$^3$. They are particularly suitable as insulating materials in the construction and refrigeration sectors, for example as the middle layer in sandwich elements or for foam-filling refrigerator and freezer housings.

EXAMPLES

PREPARATION OF POLYOXYALKYLENE-POLYOLS

Example 1

334 g of pentaerythritol, 522 g of diethylene glycol and 37 g of aqueous potassium hydroxide solution (47%) were introduced into a 10 l stirred autoclave, and the alkoxide was formed at 90° C. and under reduced pressure (25 mbar) over the course of 1 hour. After the pressure had been equalized by means of nitrogen and the temperature had been reduced to 60° C., 841 g of sucrose were slowly added under a constant stream of nitrogen, and the mixture was stirred for 1 hour. The reactor temperature was subsequently increased to 110° C., and 3823 g of propylene oxide were metered in at a constant rate over the course of 6 hours. After a reaction-completion phase of 3 hours, all residual monomers were removed under reduced pressure (1 mbar, 30 minutes, 110° C.), and 50 g of water and 200 g of adsorbent (synthetic magnesium/aluminum silicate) were added in order to remove the catalyst. After a stirring time of 2 hours, the solids were removed by pressure filtration, and the water was removed from the polyether-ol under reduced pressure (1 mbar, 2 hours, 100° C.). For stabilization, 7.5 g of di-tert-butyl-p-cresol were subsequently dissolved in the finished polyether-ol, and the product was homogenized. The resultant polyether product had a hydroxyl number of 400 mg of KOH/g, a viscosity of 1850 mPa·s, a residual water content of 0.02% by weight, based on the polyether-ol weight, and a functionality of 3.9.

Example 2

(Comparison)

684 g of sucrose, 272 g of pentaerythritol, 298 g of diethylene glycol and 37 g of aqueous potassium hydroxide solution (47%) were mixed under nitrogen in a 10 l stirred autoclave, and 4328 g of propylene oxide were subsequently introduced at 110° C. over the course of 6 hours. After a reaction-completion phase of 3 hours, all residual monomers were removed under reduced pressure (1 mbar, 30 minutes, 110° C.), and 50 g of water and 200 g of adsorbent were added in order to remove the catalyst. After a stirring time of 2 hours, the solids were removed by pressure filtration, and the water was removed from the polyether-ol under reduced pressure (1 mbar, 2 hours, 100° C.). For stabilization, 7.5 g of di-tert-butyl-p-cresol were subsequently dissolved in the finished polyether-ol, and the product was homogenized. A product was obtained which had a hydroxyl number of 297 mg of KOH/g, a viscosity of 1320 mPa·s at 25° C., a residual water content of 0.035% by weight, based on the polyether-ol weight, and a functionality of 4.3.

Example 3

(Comparison)

787 g of sucrose, 312 g of pentaerythritol, 345 g of diethylene glycol and 36.7 g of aqueous potassium hydroxide solution (47%) and 4070 g of propylene Oxide were reacted by the process described under Comparative Example 1 to give a polyether-polyol having a hydroxyl number of 350 mg of KOH/g, a viscosity of 1990 mPa·s at 25° C., a residual water content of 0.02% by weight, based on the polyether-ol weight, and a functionality of 4.3.

Example 4

(Comparison)

841 g of sucrose, 335 g of pentaerythritol, 241 g of diethylene glycol and 36.9 g of aqueous potassium hydroxide solution (47%) and 4075 g of propylene oxide were reacted by the process described under Comparative Example 1 to give a polyether-polyol having a hydroxyl number of 343 mg of KOH/g, a viscosity of 2630 mPa·s at 25° C., a residual water content of 0.015% by weight, based on the polyether-ol weight, and a functionality of 4.7.

Example 5

(Comparison)

855 g of sucrose, 345 g of glycerol, 311 g of diethylene glycol and 16.7 g of aqueous potassium hydroxide solution (47%) and 3999 g of propylene oxide were reacted by the process described under Comparative Example 1 to give a polyether-polyol having a hydroxyl number of 381 mg of KOH/g, a viscosity of 2670 mPa·s at 25° C., a residual water content of 0.02% by weight, based on the polyether-ol weight, and a functionality of 4.0.

Example 6

(Comparison)

1039 g of sucrose, 257 g of glycerol, 334 g of diethylene glycol and 18.0 g of aqueous potassium hydroxide solution (47%) and 3877 g of propylene oxide were reacted by the process described under Comparative Example 1 to give a polyether-olyol having a hydroxyl number of 384 mg of KOH/g, a viscosity of 3130 mPa·s at 25° C., a residual water content of 0.02% by weight, based on the polyether-ol weight, and a functionality of 4.3.

Example 7

(Comparison)

1368 g of sucrose, 616 g of diethylene glycol, 41.1 g of aqueous potassium hydroxide solution (47%) and 4166 g of propylene oxide were reacted by the process described under Comparative Example 1 to give a polyether-polyol having a hydroxyl number of 453 mg of KOH/g, a viscosity of 4390 mPa·s at 25° C., a residual water content of 0.01% by weight, based on the polyether-ol weight, and a functionality of 4.4.

Example 8

(Comparison)

1026 g of sucrose, 934 g of diethylene glycol, 39.2 g of aqueous potassium hydroxide solution (47%) and 3900 g of propylene oxide were reacted by the process described under Comparative Example 1 to give a polyether-polyol having a hydroxyl number of 458 mg of KOH/g, a viscosity of 1210 mPa·s at 25° C., a residual water content of 0.02% by weight, based on the polyether-ol weight, and a functionality of 3.5.

Example 9

(Comparison)

912 g of sucrose, 404 g of diethylene glycol, 37.7 g of aqueous potassium hydroxide solution (47%) and 4150 g of propylene oxide were reacted by the process described under Comparative Example 1 to give a polyether-polyol having a hydroxyl number of 305 mg of KOH/g, a viscosity of 1630 mPa·s at 25° C., a residual water content of 0.013% by weight, based on the polyether-ol weight, and a functionality of 4.4.

Example 10

(Comparison)

771 g of sucrose, 191 g of glycerol, 18.0 g of aqueous potassium hydroxide solution (47%), 35.3 g of water and 4168 g of propylene oxide were reacted by the process described under Comparative Example 1 to give a polyether-polyol having a hydroxyl number of 335 mg of KOH/g, a viscosity of 1715 mPa·s at 25° C., a residual water content of 0.01% by weight, based on the polyether-ol weight, and a functionality of 4.3.

The OH number was determined in accordance with DIN 53 240, the viscosity in accordance with DIN 51 550 and the water content in accordance with DIN 51 777.

Examples 11 to 16

Production of rigid foams containing urethane groups 100 g of rigid foam polyol, 1.0 g of silicone-based foam stabilizer (Polyurax SR 321, BP Chemicals), 1.4 g of N,N,N',N'-tetramethylhexamethylenediamine and 4.5 g of water were used to prepare a polyol component, which was foamed with an isocyanate component to give a rigid polyurethane foam.

The isocyanate component used was a mixture of diphenylmethane diisocyanates and polyphenyl-polymethylene polyisocyanates having an NCO content of 31% by weight, based on the isocyanate component, and a viscosity of 200 mPa·s at 23° C.

The foaming was carried out by reacting the above-described polyol component with the amounts indicated in Table 1 of the isocyanate component.

To this end, the two components were held at 23° C., mixed vigorously at 23° C. for 10 seconds by means of a stirrer at 1200 rpm, and the reaction mixture was introduced into a polystyrene beaker with a capacity of 1.1 l, where it was allowed to expand.

The following properties were determined on the resultant rigid foams containing urethane groups:

the rise and setting times, the overall density in accordance with DIN 53 420, the setting height by means of an LAM 80 airborne sound distance measuring instrument from Krautkrämer, Burgwedel, Germany, the increase in compressive strength as a function of time by means of a T2001 tension/pressure tester In parallel, the quadrupled amounts of polyol and isocyanate components were mixed under the stated conditions, and the reaction mixture was allowed to expand freely in a box measuring 20×20×20 cm.

The compressive strength in accordance with DIN 53 421 was determined on the rigid polyurethane foam produced in this way after storing for 24 hours at room temperature.

The flow properties were measured in a conventional flow mold having a tube diameter of 42 mm; the initial weight of components A and B was 100 g.

The results are shown in the Table.

TABLE

| Ex. | Polyol from Ex. | Amount of isocyanate [g] | Initiation time [s] | Setting time [s] | Overall density [g/l] | Setting height [%] | Compressive Strength 2.5 min [N] | 35 min [N] | 45 min [N] | 55 min [N] | Flow properties (foam length) [cm] | Compressive hardness parallel [kPa] | perpendicular [kPa] |
|---|---|---|---|---|---|---|---|---|---|---|---|---|---|
| 11 | 1 | 181 | 19 | 66 | 35.0 | 84.8 | 25.1 | 56.3 | 79.2 | 95.3 | 145 | 256 | 74 |
| 12 | 2 | 152 | 22 | 76 | 36.8 | 83.3 | 17.4 | 27.9 | 47.8 | 73.4 | 129 | 239 | 75 |
| 13 | 3 | 164 | 17 | 67 | 35.7 | 84.9 | 17.0 | 43.3 | 68.3 | 88.9 | 134 | 237 | 81 |
| 14 | 4 | 163 | 18 | 69 | 36.4 | 84.0 | 22.0 | 48.4 | 75.2 | 88.8 | 138 | 253 | 86 |
| 15 | 5 | 176 | 18 | 65 | 34.5 | 84.5 | 23.9 | 57.9 | 81.2 | 87.1 | 137 | 260 | 78 |
| 16 | 6 | 181 | 18 | 63 | 35.0 | 84.7 | 21.8 | 54.9 | 79.9 | 91.7 | 133 | 221 | 87 |

We claim:

1. A process for the production of rigid polyurethane foam comprising reacting a) organic and/or modified organic polyisocyanates with b) at least one high-molecular-weight compound containing at least two reactive hydrogen atoms, in the presence of c) blowing agents, and d) catalysts, where the high-molecular-weight compounds (b) containing at least two reactive hydrogen atoms comprise polyoxypropylene-polyols and/or polyoxyethylene-polyoxypropylene-polyols containing up to 20% by weight, based on the weight of the alkylene oxide units, of pendant oxyethylene units, and said polyols having a functionality of from 3.8 to 4.1, a hydroxyl number of from 385 to 410 mg of KOH/g and a viscosity of from 1700 to 2400 mPa·s at 25° C., prepared by polymerization of 1,2-propylene oxide and, optionally, ethylene oxide on an initiator molecule mixture comprising sucrose, pentaerythritol and diethylene glycol.

2. A process as claimed in claim 1, wherein the initiator molecule mixture comprises, based on the total weight of the polyoxyalkylene-polyol, from 12 to 18% by weight of sucrose, from 4 to 7% by weight of pentaerythritol and from 8 to 11% by weight of diethylene glycol.

3. A process as claimed in claim 2, wherein an alkoxide is first formed from pentaerythritol, diethylene glycol and the alkaline catalyst with complete removal of the water of reaction, the sucrose is then added, the mixture is fully homogenized, and only then is the resultant initiator mixture reacted with alkylene oxide.

4. A process as claimed in claim 1, wherein an alkoxide is first formed from pentaerythritol, diethylene glycol and the alkaline catalyst with complete removal of the water of reaction, the sucrose is then added, the mixture is fully homogenized, and only then is the resultant initiator mixture reacted with alkylene oxide.

5. A polyoxypropylene polyol and/or a polyoxyethylene-polyoxypropylene polyol containing up to 20 percent by weight, based on the weight of the alkylene oxide units, of pendant oxyethylene units; having a functionality of from 3.8 to 4.1, a hydroxyl number of from 385 to 410 mg of KOH/g, a viscosity of from 1700 to 2400 in mPa·s at 25° C., prepared by adding 1,2-propylene oxide, and optionally ethylene oxide, onto an initiator molecule mixture comprising sucrose, pentaerythritol, and diethylene glycol.

6. The polyoxypropylene polyol and/or polyoxyethylene-polyoxypropylene polyol of claim 5, wherein the initiator molecule mixture comprises, based on the total weight of the polyoxyalkylene-polyol, from 12 to 18 percent by weight of sucrose, from 4 to 7 percent by weight of pentaerythritol and from 8 to 11 percent by weight of diethylene glycol.

7. A process as claimed in claim 5, wherein an alkoxide is first formed from pentaerythritol, diethylene glycol and the alkaline catalyst with complete removal of the water of reaction, the sucrose is then added, the mixture is fully homogenized, and only then is the resultant initiator mixture reacted with alkylene oxide.

8. The process of claim 5, further comprising reacting an organic and/or modified organic polyisocyanate with said polyol in the presence of a blowing agent and a catalyst.

* * * * *